United States Patent
Inagaki et al.

(10) Patent No.: US 11,203,892 B2
(45) Date of Patent: Dec. 21, 2021

(54) EXTENSIBLE/CONTRACTIBLE DRIVING DEVICE AND OPENING/CLOSING MECHANISM

(71) Applicant: HI-LEX CORPORATION, Takarazuka (JP)

(72) Inventors: Hiroyuki Inagaki, Takarazuka (JP); Hitoshi Osafune, Takarazuka (JP)

(73) Assignee: HI-LEX CORPORATION, Takarazuka (JP)

( * ) Notice: Subject to any disclaimer, the term of this patent is extended or adjusted under 35 U.S.C. 154(b) by 0 days.

(21) Appl. No.: 15/524,430

(22) PCT Filed: Nov. 19, 2015

(86) PCT No.: PCT/JP2015/082499
§ 371 (c)(1),
(2) Date: May 4, 2017

(87) PCT Pub. No.: WO2016/080478
PCT Pub. Date: May 26, 2016

(65) Prior Publication Data
US 2018/0283075 A1    Oct. 4, 2018

(30) Foreign Application Priority Data
Nov. 20, 2014    (JP) .............................. JP2014-235582

(51) Int. Cl.
*E05F 15/622*    (2015.01)
*E05F 15/611*    (2015.01)
*E05F 15/616*    (2015.01)

(52) U.S. Cl.
CPC .......... *E05F 15/622* (2015.01); *E05F 15/611* (2015.01); *E05F 15/616* (2015.01)

(58) Field of Classification Search
CPC .............................. E05F 15/611; E05F 15/622
See application file for complete search history.

(56) References Cited

U.S. PATENT DOCUMENTS

| 4,679,451 A | * | 7/1987 | Nakamura | .............. F16H 25/20 74/606 R |
| 6,530,305 B1 | * | 3/2003 | MacLeod | .................. F41F 3/04 114/238 |

(Continued)

FOREIGN PATENT DOCUMENTS

| DE | 102009007958 A1 | 10/2010 |
| DE | 102012014135 A1 | 1/2014 |

(Continued)

OTHER PUBLICATIONS

International Search Report for International Application No. PCT/JP2015/082499 dated Feb. 9, 2016.

(Continued)

*Primary Examiner* — Gregory J Strimbu
(74) *Attorney, Agent, or Firm* — Kratz, Quintos & Hanson, LLP

(57) ABSTRACT

An extensible or contractible driving device that reduces failure caused by water intrusion. A motor (13) is provided in an outer cylinder (7). An inner cylinder (9) is provided on an inner side of the outer cylinder (7), a tip of the inner cylinder has a closing structure, and the inner cylinder relatively moves in an axial direction with respect to the outer cylinder (7). A screw (11) is rotationally driven by a driving force of the motor (13). A guide nut (15) is driven by the screw (11) and moved in a rotation axis direction of the screw (11). A coil spring (17) is disposed on an outer periphery of the screw (11), comes into contact with a tip of the inner cylinder (9), and applies force to the guide nut (15). The screw (11), the guide nut, and the coil spring (17) are housed in an inner space (25) formed by the outer cylinder (7) and the inner cylinder (9). A fluid intake/outlet port (29) is provided at the tip of the inner cylinder (9).

7 Claims, 4 Drawing Sheets

(56) References Cited

U.S. PATENT DOCUMENTS

| | | | | |
|---|---|---|---|---|
| 10,123,887 B2* | 11/2018 | Cheng | ...................... | A61F 2/64 |
| 2009/0199668 A1 | 8/2009 | Batosky | | |
| 2011/0290050 A1 | 12/2011 | Kummer | | |
| 2012/0137591 A1* | 6/2012 | Bochen | ................. | E05F 15/622 |
| | | | | 49/324 |
| 2014/0000394 A1* | 1/2014 | Anheier | .................. | F16H 25/20 |
| | | | | 74/89.29 |
| 2015/0300468 A1* | 10/2015 | Ritter | ...................... | F16D 51/02 |
| | | | | 74/89.39 |
| 2016/0177609 A1* | 6/2016 | Nishikibe | ............... | E05F 1/002 |
| | | | | 49/31 |
| 2017/0081895 A1* | 3/2017 | Osafune | ..................... | B60J 5/10 |
| 2017/0328114 A1* | 11/2017 | Osafune | ................. | F16H 25/20 |
| 2017/0362876 A1* | 12/2017 | Ishikawa | .............. | E05F 15/622 |

FOREIGN PATENT DOCUMENTS

| | | | |
|---|---|---|---|
| JP | 2007-331699 | A | 12/2007 |
| JP | 2007-331699 | A1 | 12/2007 |
| JP | 2009-192081 | A1 | 8/2009 |
| JP | 2011-106227 | A1 | 6/2011 |
| JP | 2012-512973 | A1 | 6/2012 |
| JP | 2013-104228 | A1 | 5/2013 |

OTHER PUBLICATIONS

Office Action of corresponding German Patent Application No. 112015005249.6 dated Dec. 10, 2020 (7 sheets, 6 sheets translation, 13 sheets total).

Pahl, G.; "Konstruktionslehre" [Theory of design—fundamentals of successful product development]; 6th edition; Berlin; Springer; 2005; p. 392 (1 page, 2 cover pages, 3 pages total).

\* cited by examiner

[Fig. 1]
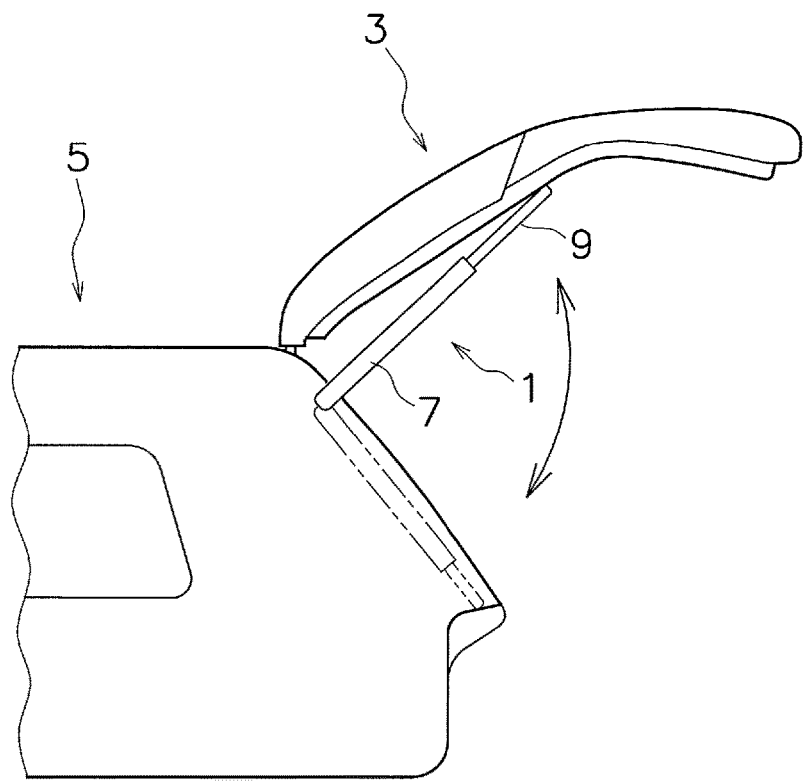
[Fig. 2]
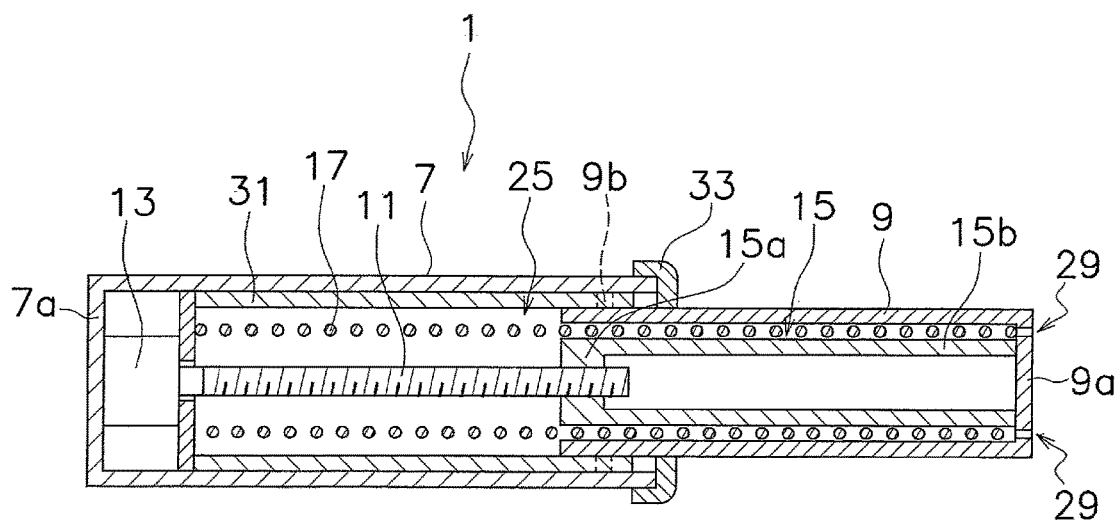

[Fig. 3]
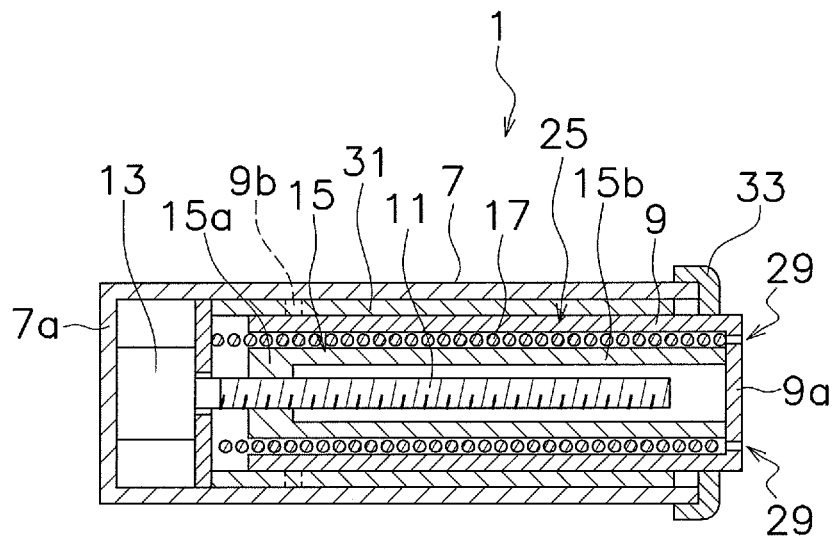
[Fig. 4]
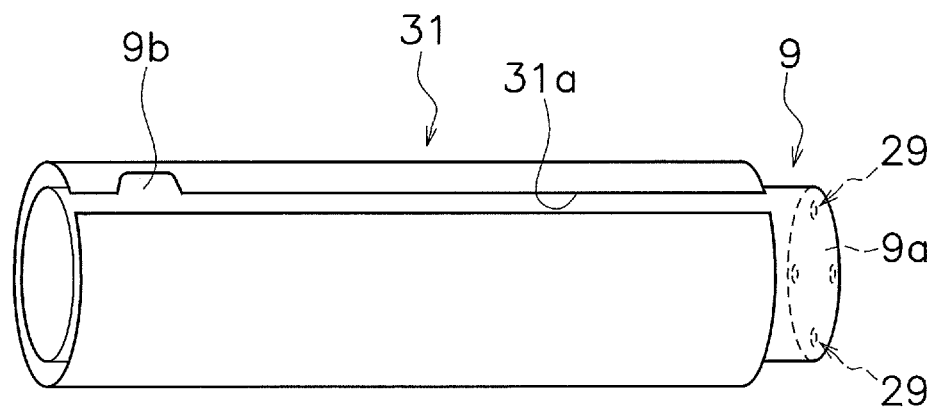

【Fig. 5】
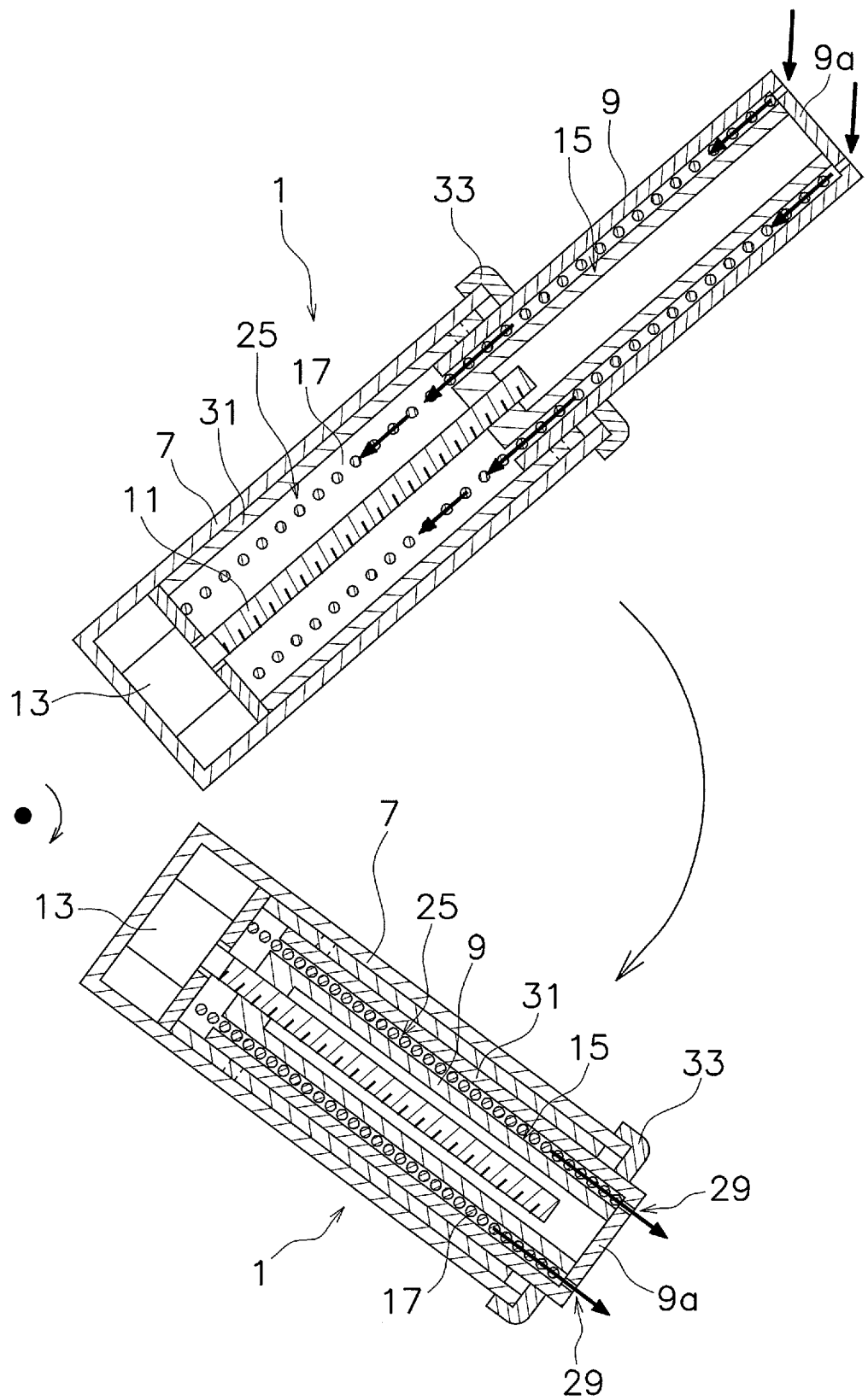

[Fig. 6]
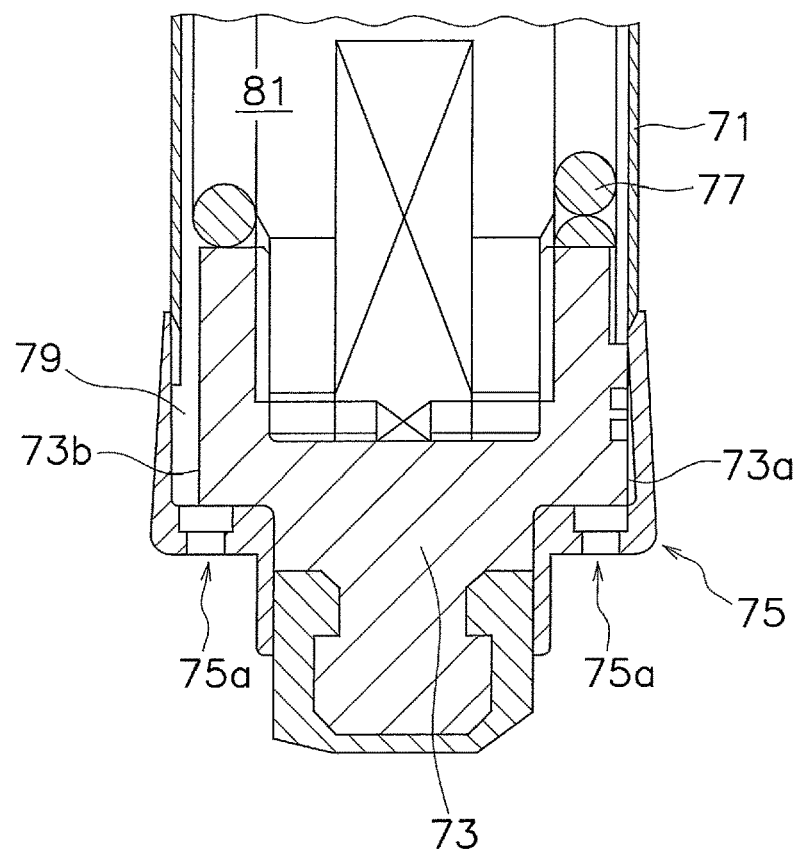
[Fig. 7]
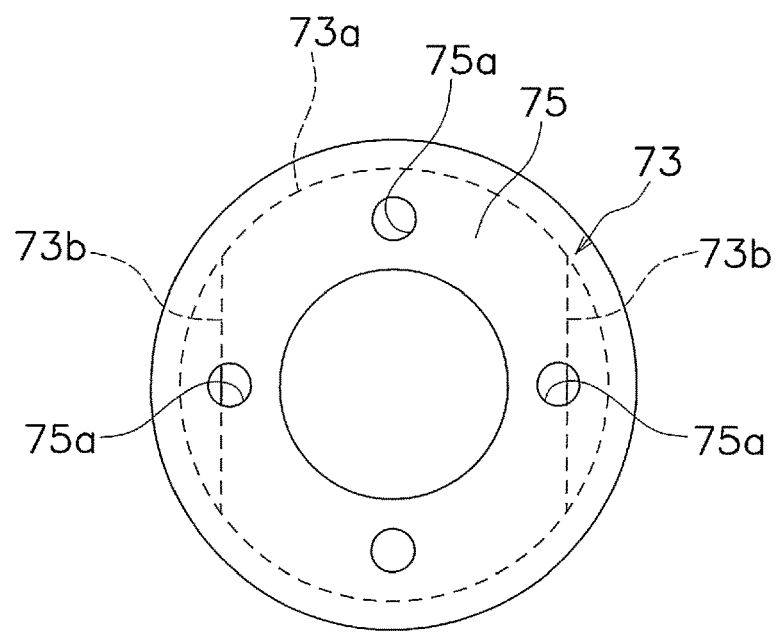

EXTENSIBLE/CONTRACTIBLE DRIVING DEVICE AND OPENING/CLOSING MECHANISM

TECHNICAL FIELD

The present invention relates to an extensible/contractible driving device and an opening/closing mechanism.

BACKGROUND ART

For example, as a device to open and close an opening/closing body such as a back door of a vehicle, an opening/closing body driving device is known. In the opening/closing body driving device, for example, a shaft is extended and contracted by a motor, and consequently an opening/closing body is opened and closed (for example, refer to Patent Literature 1).

CITATION LIST

Patent Literature

Patent Literature 1: JP 2013-104228 A

SUMMARY OF INVENTION

Technical Problem

A driving spindle 21 as an opening/closing body driving device described in Patent Literature 1 includes a body portion 23 and a spindle 25. The spindle 25 is slidably engaged with the body portion 23. The body portion 23 is connected to a body 13, and the spindle 25 is connected to an opening/closing body 3. The spindle 25 is moved with respect to the body portion 23 by a motor and a motion direction converting mechanism which converts a rotary motion into a linear motion. As a result, the driving spindle 21 is extended and contracted, and the opening/closing body 3 is opened and closed.

In this case, in a state in which the opening/closing body 3 is opened, the driving spindle 21 extends obliquely upward. Specifically, the spindle 25 is positioned on an upper side of the body portion 23. In this case, when rain water or washing water is splashed to a vehicle, air is taken in from a joint to increase an inside volume by extensible/contractible driving from a space in contact with the spindle 25 and the body portion 23. At the same time, water also enters into the driving spindle 21. Then, the water enters into the driving spindle 21. However, the entering water does not easily escape from the space in contact with the spindle 25 and the body portion 23, and the water is stored in the driving spindle 21. When the water is stored in the driving spindle 21, a motion converting mechanism is rusted. Consequently, the spindle 25 does not smoothly extend and contract. The contact portion between the spindle 25 and the body portion 23 is easily abraded and may be rusted when getting wet with water. An issue of the present invention is to reduce a failure due to water intrusion in an extensible/contractible driving device.

Solution to Problem

A plurality of embodiments will be described below as a means to solve a problem. The embodiments can be arbitrarily combined as needed. An extensible/contractible driving device according to an aspect of the present invention includes an outer cylinder, an inner cylinder, a rotary driving member, a driving force transmission member, and an elastic member. A driving unit is provided in the outer cylinder. The inner cylinder is provided on an inner side of the outer cylinder, a tip of the inner cylinder has a closing structure, and the inner cylinder relatively moves in an axial direction with respect to the outer cylinder. The rotary driving member is rotationally driven by a driving force of a driving unit. A driving force transmission member is driven by a rotary driving member and moved in a rotation axis direction of the rotary driving member. An elastic member is disposed on an outer periphery of the driving force transmission member, comes into contact with a tip of the inner cylinder, and applies an biasing force in a rotation axis direction to the driving force transmission member. The elastic member can directly apply the biasing force to the driving force transmission member or indirectly apply the force via the inner cylinder. The rotary driving member, the driving force transmission member, and the elastic member are housed in an inner space formed by the outer cylinder and the inner cylinder. A fluid intake/outlet port is provided at a tip of the inner cylinder. In this device, when a driving unit drives the rotary driving member, the driving force transmission member moves the inner cylinder in an axial direction with respect to the outer cylinder. Consequently, the outer cylinder and the inner cylinder are extended/contracted. When water enters into the inner space formed by the outer cylinder and the inner cylinder, the water moves to a tip of the inner cylinder, for example, through an elastic member in the inner space and is finally exhausted from a fluid intake/outlet port provided in the inner cylinder. Therefore, water is not easily stored in the inner space over a long period of time. A tip of the inner cylinder is disposed at a position where water can be effectively exhausted by providing an intake/outlet port, and may be disposed, for example, on a tip surface of the inner cylinder and a peripheral surface on a tip side of the inner cylinder.

The extensible/contractible driving device may further include a guide member which is disposed on an outer periphery of an elastic member and guides a driving force transmission member. The guide member includes a guide portion to guide the driving force transmission member in a rotation axis direction while restricting rotation of the driving force transmission member, and the driving force transmission member is guided to the rotation axis direction while restricting rotation by the guide member. In this case, the guide member is disposed on an outer periphery of an elastic member. Therefore, for example, water moving through the elastic member does not easily move to an outer cylinder side since the water is blocked by the guide member. Therefore, water does not easily move to a driving unit side through the outer cylinder. As a result, a failure of a driving unit does not easily occur.

The extensible/contractible driving device may further include a seal member provided at a tip edge of an outer cylinder and contacting with an outer peripheral surface of an inner cylinder. In the device, the seal member prevents water from entering into an inner space. An opening/closing mechanism according to another aspect of the present invention includes the above-described extensible/contractible driving device, an opening/closing body, and a fixing object by which a position of the extensible/contractible driving device is fixed. Such that the opening/closing body is driven by drive of the extensible/contractible driving device, a base end of the extensible/contractible driving device is connected to the fixing object, a tip of the extensible/contractible driving device is connected to the opening/closing body, and the opening/closing body is opened and closed.

Advantageous Effects of Invention

In an extensible/contractible driving device and an opening/closing mechanism according to the present invention, a failure due to water intrusion is reduced.

BRIEF DESCRIPTION OF DRAWINGS

FIG. 1 is a schematic side surface view of a vehicle rear portion.

FIG. 2 is a sectional view of an extensible/contractible driving device according to a first embodiment.

FIG. 3 is a sectional view of the extensible/contractible driving device according to the first embodiment.

FIG. 4 is a schematic perspective view illustrating a relation between an inner cylinder and a guide member according to the first embodiment.

FIG. 5 is a sectional view of an extensible/contractible driving device in state in which an opening/closing body according to the first embodiment is opened and closed.

FIG. 6 is a sectional view of a tip of an inner cylinder of an extensible/contractible driving device according to a second embodiment.

FIG. 7 is a schematic elevation view of the inner cylinder according to the second embodiment.

DESCRIPTION OF EMBODIMENTS

1. First Embodiment (1) Schematic Configuration of Extensible/Contractible Driving Device With reference to FIG. 1, an extensible/contractible driving device 1 will be described below as an embodiment of the present invention. FIG. 1 is a schematic side surface view of a vehicle rear portion. The extensible/contractible driving device 1 is a device to open and close an opening/closing body 3. The extensible/contractible driving device is not limited to an opening/closing driving device and, for example, can be applied to a device to vertically, horizontally, or obliquely move a product or a structure. An object of the present invention is to take measures to prevent water intrusion. Therefore, the extensible/contractible driving device 1 can be preferably used outside or in an environment in which the extensible/contractible driving device gets wet with water. In the extensible/contractible driving device 1, such that an opening/closing body is driven by drive of the extensible/contractible driving device 1, a base end is connected to a fixing object, and a tip is connected to the opening/closing body. Therefore, the extensible/contractible driving device 1 can be used as a driving device of an opening/closing mechanism which opens and closes the opening/closing body. A position of the extensible/contractible driving device 1 is fixed by being fixed to the fixing object and may be fixed so as to pivot around a contact portion with the fixing object.

The opening/closing body 3 is a back door to open and close a rear portion of a vehicle 5 in an example illustrated in FIG. 1. In addition, the opening/closing body 3 may be, for example, a sliding door to open and close an opening on a side surface and may be a window such as an automatic opening and closing window. Further, the opening/closing body 3 may be an openable and closable wall (door) which separates one space from another space.

The extensible/contractible driving device 1 is a device to drive the opening/closing body 3 by converting rotary movement of such as a motor into extending/contracting movement in a liner direction. In the extensible/contractible driving device 1, one end in a longitudinal direction is connected on a vehicle inner side of the opening/closing body 3, and another end is connected to a rear portion of a vehicle body of the vehicle 5. The extensible/contractible driving device 1 can drive the opening/closing body 3 by extending and contracting in the longitudinal direction. The extensible/contractible driving device 1 is disposed such that the opening/closing body 3 can move to a fully open position or a fully close position. In the extensible/contractible driving device 1, a position of the device to be disposed and a number of the devices to be used are not especially limited as long as the opening/closing body 3 can be opened and closed. One extensible/contractible driving device 1 may be disposed each on both right and left sides of the vehicle 5, and the opening/closing body 3 and also may be disposed on either of right or left side of the vehicle body. Further, two or more extensible/contractible driving devices 1 may be disposed. Furthermore, the extensible/contractible driving device 1 and a gas damper may be combined for use.

(2) Detailed Configuration of Extensible/Contractible Driving Device

With reference to FIGS. 2 and 3, a configuration of the extensible/contractible driving device 1 will be described. FIGS. 2 and 3 are sectional views of the extensible/contractible driving device according to the first embodiment. The extensible/contractible driving device 1 includes an outer cylinder 7, an inner cylinder 9, a screw 11, a motor 13, a guide nut 15, and a coil spring 17. An inner space 25 is formed by the outer cylinder 7 and the inner cylinder 9, and the screw 11, the guide nut 15, and the coil spring 17 are housed in the inner space 25. A longitudinal direction in which the outer cylinder 7 and the inner cylinder 9 extend is called an axis direction in a description below.

Specifically, the outer cylinder 7 is a bottomed cylindrical member, and one end surface is opened. A first fitting member (not illustrated) is provided at a closed end 7a of the outer cylinder 7. The first fitting member is, for example, a ball socket joint and rotatably connected to the fitting member (not illustrated) provided in a rear portion of the vehicle 5. The inner cylinder 9 is provided on an inner side of the outer cylinder 7. A base end of the inner cylinder 9 has a closing structure, and the inner cylinder 9 relatively moves in an axial direction with respect to the outer cylinder 7. Specifically, the inner cylinder 9 is a bottomed cylindrical member, and one end surface is opened. An outer diameter of the inner cylinder 9 is shorter than an inner diameter of the outer cylinder 7, and the inner cylinder 9 fits into the outer cylinder 7 from an opening provided at a tip of the outer cylinder 7. Specifically, an opening provided at a base end of the inner cylinder 9 is inserted into an opening provided at a tip of the outer cylinder 7. Consequently, the inner cylinder 9 and the outer cylinder 7 are engaged. In such a state, the inner cylinder 9 can move back and forth with respect to the outer cylinder 7. FIG. 2 illustrates a state in which the inner cylinder 9 is most protruded from the outer cylinder 7. FIG. 3 illustrates a state in which the inner cylinder 9 is most drawn into the outer cylinder 7. A second fitting member (not illustrated) is provided on a tip surface 9a of the inner cylinder 9. The second fitting member is, for example, a ball socket joint and is rotatably connected to the fitting member (not illustrated) of the opening/closing body 3.

As described above, a space defined by the outer cylinder 7 and the inner cylinder 9 from outside of the extensible/contractible driving device 1 is the inner space 25. A volume of the inner space 25 and a position occupied by the inner space 25 are changed by movement of the inner cylinder 9 with respect to the outer cylinder 7. For example, in a state in which the inner cylinder 9 is most protruded from the outer cylinder 7 as illustrated in FIG. 2, a volume of the inner space 25 is maximized and increasing in a tip side, and a position occupied by the inner space 25 is changed by the increased amount. In addition, as illustrated in FIG. 3, a volume of the inner space 25 is most reduced in a state in which the inner cylinder 9 is most drawn into the outer cylinder 7. The screw 11 as a rotary driving member is rotationally driven by a driving force of the motor 13. Specifically, the screw 11 is a rod-shaped member formed in a shape in which a screw thread is projected outside in a circumferential direction on an outer peripheral surface. The screw 11 is rotatably supported around a shaft by a bearing (not illustrated) fixed in an inner portion of the outer cylinder 7.

The motor 13 is provided in the outer cylinder 7. The screw 11 is connected to an output rotation shaft of the motor 13. As a result, the motor 13 is driven when power is supplied to a power source (not illustrated) based on a motor control signal from a controller (not illustrated) and causes the screw 11 to rotate around a shaft. The screw 11 may be directly connected to the output rotation shaft of the motor 13 or may be connected to the output rotation shaft of the motor 13 via a deceleration mechanism. In the embodiment, the motor 13 is an electric motor which is a DC motor or an AC motor. In the case where the extensible/contractible driving device 1 is used as an opening and closing driving device to open/close a door of a vehicle, a DC motor is preferably used since a DC power source of the vehicle can be used. The motor 13 is provided on a base end side of the outer cylinder 7 and fixed in the outer cylinder 7.

The guide nut 15 as a driving force transmission member is driven by the screw 11 and moved in a rotation axis direction of the screw 11. Specifically, the guide nut 15 includes a screw portion 15a screwed with the screw 11 and a cylindrical portion 15b coaxially extending with the screw portion 15a from the screw portion 15a. A tip of the cylindrical portion 15b is fixed on an inner surface of the tip surface 9a of the inner cylinder 9. As a result, the guide nut 15 integrally moves with the inner cylinder 9. The guide nut 15 which is a driving force transmission member is screwed with an outer periphery of the screw 11 which is a rotary driving member and relatively rotates with rotation of the screw 11. When the screw 11 rotates in a predetermined rotation direction, the cylindrical portion 15b of the guide nut 15 is moved so as to extend in an extending direction of the screw 11. Since the cylindrical portion 15b moves as described above, the inner cylinder 9 can move so as to project from the outer cylinder 7. When the screw 11 rotates in a direction opposite to the predetermined rotation, the inner cylinder 9 can move so as to be drawn into the outer cylinder 7. The coil spring 17 as an elastic member is disposed on an outer periphery of the guide nut 15, comes into contact with a tip of the inner cylinder 9, and applies an biasing force to the guide nut 15 in a rotation axis direction. In this example, the guide nut 15 is energized in a direction away from the outer cylinder 7. Specifically, the coil spring 17 covers the guide nut 15 and the screw 11. Such that a predetermined biasing force is generated in an axial direction, one end of the coil spring 17 is disposed so as to contact with a seat surface of an inner wall of the outer cylinder 7 on a side where the motor 13 is provided, and another end is disposed so as to contact with an inner surface of the tip surface 9a of the inner cylinder 9. As a result, the coil spring 17 applies an biasing force in an axial direction to the outer cylinder 7 and the inner cylinder 9.

One end of the coil spring 17 may be fixed to a predetermined position of the outer cylinder 7, and another end may be fixed to a predetermined position of the inner cylinder 9, such that a predetermined biasing force is generated in an axial direction. The biasing force in an axial direction is applied to the inner cylinder 9 by the coil spring 17. As a result, "looseness" in a screwing portion between the guide nut 15 and the screw 11 can be suppressed. As a result, for example, a time lag from start of rotation of the motor 13 to start of a move forward/back operation in an axial direction of the guide nut 15 and the inner cylinder 9 can be suppressed. That is, with respect to a driving signal output from a controller to the extensible/contractible driving device 1, the extensible/contractible driving device 1 can be driven without causing control loss such as delay.

A fluid intake/outlet port 29 is provided at a tip of the inner cylinder 9. The intake/outlet port 29 is a structure in which air is exhausted to the outside from the inner space 25 when the inner space 25 is reduced, and air is taken in in the inner space 25 from the outside when the inner space 25 is expanded. A tip of the inner cylinder 9 is disposed at a position where water can be effectively exhausted by providing an intake/outlet port, and may be disposed, for example, on the tip surface 9a of the inner cylinder 9 and a peripheral surface on a tip side of the inner cylinder 9. Here, when the extensible/contractible driving device 1 is contracted, air is exhausted from the intake/outlet port 29 provided at a tip of the inner cylinder 9, and air flow toward the outside of the extensible/contractible driving device 1 is generated around the intake/outlet port. This air flow is a flow to a tip of the inner cylinder 9. Differently from the case where an intake/outlet port is provided at a tip of an outer cylinder, the intake/outlet port is provided on the most tip side. Therefore, air does not spread by exceeding a portion in which the intake/outlet port is provided when the device is contracted. Therefore, water taken from the intake/outlet port 29 when the extensible/contractible driving device 1 is extended can be easily exhausted from the intake/outlet port 29 when air is exhausted. In the embodiment, specifically, the intake/outlet port 29 is a hole formed on the tip surface 9a of the inner cylinder 9, in other words, a hole penetrating an inner side and an outer side of the extensible/contractible driving device 1 in an axial direction. In addition, water entering into the inner space 25 can be easily exhausted to the outside from the intake/outlet port 29.

The intake/outlet port 29 may be formed on a peripheral surface on a tip side of the inner cylinder 9 and may be formed on both of the tip surface 9a of the inner cylinder 9 and the peripheral surface on the tip side. Further, although a diameter and an area of the intake/outlet port 29 are not limited, it is preferable that waste and dust do not enter into the intake/outlet port 29 from the outside, and also it is preferable that the inner cylinder 9 is smoothly movable back and forth with respect to the outer cylinder 7.

In the embodiment, the intake/outlet port 29 is a plurality of holes disposed at equal intervals in a circumferential direction on the tip surface 9a as illustrated in FIG. 4. However, a number and a position of the intake/outlet port 29 are not especially limited. When water enters into the inner space 25 formed by the outer cylinder 7 and the inner cylinder 9, the water moves to a tip of the inner cylinder 9, for example, through the coil spring 17 in the inner space 25 and is finally exhausted from a fluid intake/outlet port of the inner cylinder 9. Therefore, water is not easily stored in the inner space 25 over a long period of time. Consequently, the water taken in when the extensible/contractible driving device extends and contracts can be easily exhausted, and also the screw 11 and the guide nut 15 are covered by the coil spring 17. Therefore, a contact portion between the screw 11 and the guide nut 15 does not easily directly get wet, and a failure on a motion converting mechanism including the screw 11 and the guide nut 15 can be reduced. That is, the extensible/contractible driving device 1 is smoothly extended and contracted. In addition, a sliding portion between the outer cylinder 7 and the inner cylinder 9 of the extensible/contractible driving device 1 does not easily get wet, and therefore occurrence of rust in the sliding portion can be suppressed.

The extensible/contractible driving device 1 further includes the guide member 31 which is disposed on an outer periphery of the coil spring 17 and guides the inner cylinder 9 so as to restrict rotation of the guide nut 15. With reference to FIG. 4, the guide member 31 will be described below. FIG. 4 is a schematic perspective view illustrating a relation between an inner cylinder and a guide member. The guide member 31 includes a guide portion 31a to guide movement of the guide nut 15 in a rotation axis direction of the screw 11 while restricting rotation of the guide nut 15. The guide portion 31a is a slit extending in an axial direction. The guide member 31 is relatively unrotatably engaged with the outer cylinder 7. The guide member 31 is made of, for example, resin. The inner cylinder 9 is projected outside in a radial direction and includes a projecting portion 9b sliding with the guide portion 31a in the guide portion 31a. The projecting portion 9b is engaged with the guide portion 31a. Accordingly, the inner cylinder 9 and the guide nut 15 are movable in an axial direction but are relatively unrotatable with respect to the guide member 31. Therefore, when the screw 11 is driven by the motor 13, the guide nut 15 and the inner cylinder 9 move in an axial direction with respect to the outer cylinder 7. As a result, the outer cylinder 7 and the inner cylinder 9 are extended and contracted.

In the device, as described above, the guide nut 15 is guided in a rotation axis direction while restricting rotation of the guide nut 15 by the guide member 31 via the inner cylinder 9. However, the guide member may be disposed on an inner side of the coil spring 17 and directly guide the guide nut so as to control rotation of the guide nut. Further, in the embodiment, the guide member 31 is disposed on an outer periphery of the coil spring 17. Therefore, for example, water moving through the coil spring 17 is blocked by the guide member 31 and does not easily move to the outer cylinder 7. Therefore, water does not easily move to a driving unit, such as the motor 13, through the outer cylinder 7. As a result, a failure on the motor 13 and a driving force transmission structure can be reduced. The guide portion may have a shape projecting on one side in a radial direction. In such a case, an inner cylinder has an engaging portion to be engaged with the guide portion. In addition, a shape and a position of the guide member may not correspond to the embodiment, and the guide member may be disposed on an inner peripheral side of an elastic member and engaged with a guide nut.

The extensible/contractible driving device 1 further includes a seal member 33 which is provided at a tip edge of the outer cylinder 7 and contacting with an outer peripheral surface of the inner cylinder 9. The seal member 33 can seal a space existing between the outer cylinder 7 and the inner cylinder 9. In the device, the seal member 33 makes water hard to enter easily into the inner space 25 from the space between the outer cylinder 7 and the inner cylinder 9, and therefore the seal member 33 is preferably provided.

(3) Operation of Extensible/Contractible Driving Device

With reference to FIG. 5, opening/closing operations of the opening/closing body 3 by the extensible/contractible driving device 1 will be described below. FIG. 5 is a schematic sectional view of an extensible/contractible driving device in states in which an opening/closing body is opened and closed. As illustrated on an upper side of FIG. 5, in a state in which the opening/closing body 3 is opened, the extensible/contractible driving device 1 extends obliquely upward, and the inner cylinder 9 most extends from the outer cylinder 7. Specifically, a portion on the motor 13 side of the outer cylinder 7 is disposed on a lower side, and the tip surface 9a of the inner cylinder 9 is disposed on an upper side. It is assumed that water enters into the inner space 25 from the intake/outlet port 29 in this state. In such a case, the water moves downward through the coil spring 17 as illustrated in FIG. 5. More specifically, the water moves spirally along the coil spring 17.

Next, when the motor 13 rotates and moves the guide nut 15 on the motor 13 side, the inner cylinder 9 is drawn into the outer cylinder 7. As a result, the opening/closing body 3 is closed with rotating downward. Further, the extensible/contractible driving device 1 rotates and changes an attitude with the above operation. That is, as illustrated on a lower side of FIG. 5, the motor 13 side of the outer cylinder 7 is disposed on an upper side, and the tip surface 9a of the inner cylinder 9 is disposed on a lower side. In this state, water that has entered in the inner space 25 in advance moves downward through the coil spring 17 as illustrated in FIG. 5 and is finally exhausted to the outside through the intake/outlet port 29. The tip surface 9a of the inner cylinder 9 is positioned on a lower side. Therefore, water is most likely to be stored near an inner side of the tip surface 9a. The intake/outlet port 29 is formed at such a position, and therefore water in the inner space 25 can be effectively removed.

Further, the inner space 25 is compressed when an attitude is changed as described above, and water is smoothly exhausted from the intake/outlet port 29 by air pressure generated in the inner space 25. The water mainly moves through the coil spring 17, and therefore the guide nut 15 and the screw 11 do not easily get wet. Therefore, the water does not easily move to a screwing portion between the guide nut 15 and the screw 11 and also not easily move to the motor 13 side. Therefore, a failure on the motor 13 and a driving force transmission structure can be reduced. The guide member 31 is disposed on an outer periphery of the coil spring 17. Therefore, for example, water moving through the coil spring 17 is blocked by the guide member 31 and does not easily move to the outer cylinder 7 side. Therefore, water does not easily move to a driving unit, such as the motor 13, through the outer cylinder 7. As a result, a failure on the motor 13 and a driving force transmission structure can be reduced.

2. Second Embodiment

In the first embodiment, a tip portion of an inner cylinder and an intake/outlet port formed at the tip portion have been described with reference to schematic drawings. However, in an actual extensible/contractible driving device, the tip portion of an inner cylinder and the intake/outlet port formed at the tip portion can be realized by combination of a plurality of members. The above-described embodiment will be described below. With reference to FIGS. 6 and 7, a second embodiment of an intake/outlet port of an inner cylinder will be described. FIG. 6 is a sectional view of a tip of an inner cylinder of an extensible/contractible driving device according to the second embodiment. FIG. 7 is a schematic elevation view of the inner cylinder.

As illustrated in FIG. 6, a tip of an inner cylinder 71 includes an end member 73. The end member 73 is a member constituting a tip surface of the inner cylinder 71 and, for example, supports one end of a coil spring 77. The end member 73 has an outer peripheral surface 73a having a circular shape as an outline. Further, apart of the outer peripheral surface 73a is cut, and the end member 73 includes a flat surface 73b extending in an axial direction of the inner cylinder 71 when the inner cylinder 71 is mounted. The flat surface 73b has a small diameter shape in which a part of a circle is cut in a front view. In the embodiment, the flat surface 73b is formed at two portions facing in a radial direction. A space existing between the flat surface 73b and the inner cylinder 71 functions as a passage in which fluid flows between the inner space 25 and the intake/outlet port 29. A cap 75 is attached to the end member 73. The cap 75 is an elastic member such as rubber. The cap 75 covers the outer peripheral surface 73a of the end member 73 and is in close contact with a tip peripheral surface of the inner cylinder 71.

The cap 75 is also in close contact with the outer peripheral surface 73a. However, a space 79 extending in an axial direction is secured between an inner peripheral surface of the cap 75 and the flat surface 73b. The space 79 is communicated with the inner space 81 of the inner cylinder 9 and further extends in an axial direction from the inner space 81. In the cap 75, a plurality of intake/outlet ports 75a is formed on a surface facing in an axial direction. As illustrated in FIG. 7, two intake/outlet ports 75a are communicated with each other corresponding to the space 79. Accordingly, water in the inner space 25 moves through the space 79 and is finally exhausted from the intake/outlet port 75a. Effects obtained as this result are same as effects obtained in the first embodiment. In the embodiment, the end member 73 and the cap 75 are constituted on a tip surface of the inner cylinder 71.

A number and a position of the intake/outlet port 75a are not limited also in the second embodiment. In the embodiment, a plurality (four) of the intake/outlet ports 75a is formed in a circumferential direction. Therefore, the intake/outlet ports 75a are disposed with corresponding to the space 79 even if the cap 75 is not accurately positioned when being attached to the end member 73. A plurality of embodiments of the present invention has been described above. However, the present invention is not limited to the above-described embodiments. The present invention can be variously changed within a scope without departing from the gist of the invention. Especially, a plurality of embodiments and variations described herein can be arbitrarily combined as needed. For example, a rotary driving member may be a nut, and a driving force transmission member may be a screw.

INDUSTRIAL APPLICABILITY

The present invention can be widely applied to an extensible/contractible driving device. Especially, the extensible/contractible driving device according to the present invention can be preferably used as an opening/closing driving device used to open and close a back door. For example, as illustrated in FIG. 1, the extensible/contractible driving device is mounted to a vehicle body such that an end portion on a driving unit side of an outer cylinder of the extensible/contractible driving device is connected to the vehicle body, a tip portion of an inner cylinder is connected to a back door side, and in a closed state, a tip portion of the inner cylinder is disposed on a lower side, and an end portion on the driving unit side of the outer cylinder is disposed on an upper side. When the extensible/contractible driving device extends, the back door mounted to a vehicle body pivotally via a hinge turns. With this turn, the extensible/contractible driving device also turns such that a tip of the inner cylinder draws an arc, and a tip of the inner cylinder moves upward from a position of the back door in a closed state. At this time, the extensible/contractible driving device takes in air from an intake/outlet port provided at a tip of the inner cylinder in a state in which a tip of the inner cylinder is positioned on a lower side than an end portion of the driving unit side in the outer cylinder to relieve decompression due to extension of the device. Therefore, the intake/outlet port does not directly get wet by rain. In addition, even if water such as rain water enters into the extensible/contractible driving device from the intake/outlet port, when a back door is closed, the extensible/contractible driving device contracts in a state in which a tip of the inner cylinder is positioned on a lower side than an end of the driving unit side of the outer cylinder. Therefore, air in the extensible/contractible driving device is exhausted from the intake/outlet port in a state where water gathers at the tip of the inner cylinder, and water is also exhausted together. As described above, by mounting the extensible/contractible driving device to a vehicle, an intake/outlet port is disposed downward and by including an opening/closing driving mechanism which can easily discharge water that enters in the extensible/contractible driving device, a failure caused by the water in the opening/closing driving mechanism can be suppressed.

REFERENCE SIGNS LIST

1: extensible/contractible driving device
3: opening/closing body
5: vehicle
7: outer cylinder
9: inner cylinder
9a: tip surface
9b: projecting portion
11: screw
15: guide nut
15a: screw portion
15b: cylindrical portion
17: coil spring
21: driving spindle
23: body portion
25: inner space
29: intake/outlet port
31: guide member
31a: guide portion
33: seal member

The invention claimed is:
1. A driving device, comprising:
an outer cylinder in which a driving unit is provided;
an inner cylinder provided inside the outer cylinder, the inner cylinder having a tip, wherein the inner cylinder moves relative to the outer cylinder along a center longitudinal axis of the outer cylinder;
a rotary driving member rotationally driven by a driving force of the driving unit;

a driving force transmission member having a threaded portion operably coupled to the rotary driving member and a guide nut extending from the threaded portion, wherein the threaded portion engages and is driven by the rotary driving member along the center axis;

an elastic member is disposed between the inner cylinder and an outer periphery of the driving force transmission member and contacts the tip of the inner cylinder and applies a biasing force to the tip of the inner cylinder; and a guide member disposed on an outer periphery of the inner cylinder, wherein the guide nut is disposed on an inner periphery of the elastic member, wherein the rotary driving member, the driving force transmission member, and the elastic member are housed in a first inner space formed by the inner cylinder, wherein the tip of the inner cylinder includes one of an open intake port and an open outlet port, wherein the one of the open intake port and the open outlet port opens into a second inner space formed between the inner cylinder and the guide nut, wherein the elastic member, when compressed, is substantially housed within the second inner space formed between the inner cylinder and the guide nut, wherein the one of the open intake port and the open outlet port opens directly into the second inner space formed between the inner cylinder and the guide nut such that fluid in the second inner space can be substantially exhausted from the second inner space through the tip of the inner cylinder when the tip of the inner cylinder includes the open outlet port.

2. The driving device according to claim 1,
wherein the guide member is configured to guide the driving force transmission member, and
wherein the guide member comprises a guide portion configured to guide the driving force transmission member along the center axis while restricting rotation of the driving force transmission member.

3. The driving device according to claim 1, further comprising a seal member provided at an end of the outer cylinder and contacting the outer periphery of the inner cylinder.

4. The driving device according to claim 1, wherein at a first attitude of the driving device, the first inner space includes therein at least the elastic member, and the driving force transmission member.

5. The driving device according to claim 4, wherein at a second attitude of the driving device, the outer cylinder includes therein the guide member, the inner cylinder, the elastic member, and the driving force transmission member.

6. A mechanism, comprising:
the driving device according to claim 1;
a closure body; and
a fixing object,
wherein the closure body is driven by the driving device, a base end of the driving device is connected to the fixing object, and another end of the driving device is connected to the closure body.

7. A driving device, comprising:
an outer cylinder in which a driving unit is provided;
an inner cylinder provided inside the outer cylinder, the inner cylinder having a tip;
a rotary driving member rotationally driven by a driving force of the driving unit;
a driving force transmission member operatively connected to and driven by the rotary driving member along a longitudinal axis of the rotary driving member, the driving force transmission member including a guide nut;
an elastic member disposed between the inner cylinder and an outer periphery of the guide nut contacts the tip of the inner cylinder, and applies a biasing force to the tip of the inner cylinder; and
a guide member disposed on an outer periphery of the inner cylinder,
wherein the guide nut is disposed on an inner periphery of the elastic member,
wherein the rotary driving member, the driving force transmission member, and the elastic member are housed in a first inner space formed by the inner cylinder,
wherein the tip of the inner cylinder includes one of an open intake port and an open outlet port,
wherein the one of the open intake port and the open outlet port of the tip of the inner cylinder opens into a second inner space formed between the inner cylinder and the guide nut,
wherein the elastic member, when compressed, is substantially housed within the second inner space formed between the inner cylinder and the guide nut,
wherein the one of the open intake port and the open outlet port opens directly into the second inner space formed between the inner cylinder and the guide nut such that fluid in the second inner space can be substantially exhausted from the second inner space through the tip of the inner cylinder when the tip of the inner cylinder includes the open outlet port.

* * * * *